United States Patent
Rao

(10) Patent No.: US 8,666,189 B2
(45) Date of Patent: Mar. 4, 2014

(54) METHODS AND APPARATUS FOR FLAT REGION IMAGE FILTERING

(75) Inventor: Umesh Rao, Corvallis, OR (US)

(73) Assignee: Aptina Imaging Corporation, George Town (KY)

( * ) Notice: Subject to any disclaimer, the term of this patent is extended or adjusted under 35 U.S.C. 154(b) by 1611 days.

(21) Appl. No.: 12/222,215

(22) Filed: Aug. 5, 2008

(65) Prior Publication Data

US 2010/0034480 A1    Feb. 11, 2010

(51) Int. Cl.

| | |
|---|---|
| *G06K 9/40* | (2006.01) |
| *G06K 9/38* | (2006.01) |
| *G06T 15/00* | (2011.01) |
| *G06T 15/40* | (2011.01) |
| *H04N 7/00* | (2011.01) |
| *H04N 7/18* | (2006.01) |

(52) U.S. Cl.
USPC ........... 382/264; 382/260; 382/261; 382/262; 382/274; 382/275; 382/285; 345/419; 345/422; 348/115

(58) Field of Classification Search
USPC .......... 382/285, 260, 261, 262, 274; 345/419, 345/422; 348/115
See application file for complete search history.

(56) References Cited

U.S. PATENT DOCUMENTS

| | | | | |
|---|---|---|---|---|
| 5,771,318 A * | 6/1998 | Fang et al. | ..................... | 382/261 |
| 6,483,940 B1 * | 11/2002 | Wang | ............................ | 382/164 |
| 6,731,821 B1 | 5/2004 | Maurer et al. | | |
| 6,864,994 B1 * | 3/2005 | Harrington | ..................... | 358/1.9 |
| 6,999,634 B2 | 2/2006 | Hong | | |
| 7,366,357 B2 * | 4/2008 | Curry et al. | ..................... | 382/243 |
| 7,432,985 B2 * | 10/2008 | Ishikawa et al. | .............. | 348/616 |
| 7,734,115 B2 * | 6/2010 | Kang et al. | ..................... | 382/275 |
| 8,116,584 B2 * | 2/2012 | Lee et al. | ....................... | 382/268 |
| 2004/0190788 A1 * | 9/2004 | Imafuku et al. | ............... | 382/261 |
| 2005/0129316 A1 * | 6/2005 | Curti et al. | ..................... | 382/224 |
| 2006/0257038 A1 * | 11/2006 | Hsieh et al. | .................... | 382/251 |
| 2007/0036456 A1 * | 2/2007 | Hooper | .......................... | 382/274 |
| 2008/0205786 A1 * | 8/2008 | Young et al. | ................... | 382/261 |

FOREIGN PATENT DOCUMENTS

| | | |
|---|---|---|
| JP | 11-112978 A2 | 4/1999 |
| JP | 2000-106630 A2 | 4/2000 |
| JP | 2005-079856 A2 | 3/2005 |

OTHER PUBLICATIONS

Buades et al., "A non-local algorithm for image denoising", CVPR 2005 IEEE, vol. 2, 2005, pp. 60-65.*

* cited by examiner

*Primary Examiner* — Matthew Bella
*Assistant Examiner* — Jose M Torres
(74) *Attorney, Agent, or Firm* — David C. Kellogg

(57) ABSTRACT

An image filter and method of smoothing pixel values. A pixel value of a pixel to be smoothed is compared with block average pixel values of each of a plurality of pixel blocks. The pixel to be smoothed may be downstream from each of the pixel blocks. If the difference between the pixel value and each of the block average pixel values is less than a corresponding sigma threshold value for each of the pixel blocks, a first sigma filter utilizing the block average pixel values is applied to the pixel to be smoothed. If the difference between the pixel value and any one of the block average pixel values is not less than a corresponding sigma threshold value, a second sigma filter is applied to the pixel to be smoothed.

21 Claims, 9 Drawing Sheets

METHODS AND APPARATUS FOR FLAT REGION IMAGE FILTERING

FIELD OF INVENTION

Various embodiments of the present invention relate to noise removal as applied to flat image regions.

BACKGROUND OF THE INVENTION

Images acquired using a digital camera or image sensor may be grainy and erroneously pixilated. Even high resolution images may exhibit graininess due, in part, to noise. The graininess of an image due to noise may be reduced using a sigma filter. A sigma filter is used to smooth an image, reducing the graininess of the image, while maintaining sharp edges within the image. A sigma filter functions by replacing the value of a pixel with an average of selected pixels from within a window of pixels. The window of pixels is defined relative to a center pixel. The center pixel is the pixel whose value is to be replaced by the average pixel value of the selected pixels. The selected pixels are those pixels within the window that differ in value from the value of the center pixel by no more than a sigma value. Pixels that differ in value from the value of the center pixel by at least the sigma value are not used to determine the average pixel value. In this way, pixels are smoothed by similarly valued pixels, and edges or other high-contrast boundaries in the image are preserved instead of being averaged or smoothed by the sigma filter.

An example of sigma filtering is illustrated in FIG. 1A. In FIG. 1A, a 3×3 block 10 or window of pixels is illustrated. A center pixel $P_C$ is in the center of the 3×3 block 10. The other pixels in the 3×3 block 10 include pixels $P_1, P_2, P_3, P_4, P_5, P_6, P_7, P_8$. Each of pixels $P_1, P_2, P_3, P_4, P_5, P_6, P_7, P_8$ and center pixel $P_C$ represent like-colored pixels. For example, center pixel $P_C$ may represent a red pixel. Pixel $P_4$, then, represents the red pixel closest to the left of center pixel $P_C$. It is understood that other pixels of different colors may be interspersed between the pixel $P_4$ and the center pixel $P_C$. Only pixels of like-color are considered with relation to center pixel $P_C$. In FIG. 1B, the pixels in block 10 are illustrated with example pixel values in relation to the value of the center pixel $P_C$. The example pixel values represent eight-bit pixel values, and hence range from 0 to 255. For example, in FIG. 1B, the value of pixel $P_1$ is equal to the value of the center pixel $P_C$ plus 24 (i.e., $P_1 = P_C + 24$). For example purposes only, $P_2 = P_C + 5$, $P_3 = P_C + 10$, $P_4 = P_C + 31$, $P_5 = P_C - 22$, $P_6 = P_C - 4$, $P_7 = P_C - 1$, and $P_8 = P_C + 2$. If the sigma value for pixel $P_C$ is equal to seven, then only those pixels within block 10 with values that differ from the value of the center pixel $P_C$ by less than seven are considered in determining a new average value for the center pixel $P_C$. In the example of FIG. 1B, the only pixels in block 10 that are considered for the new average are pixels $P_2, P_C, P_6, P_7$ and $P_8$. Thus, the new value of the center pixel $P_C$ is equal to the average value of pixels $P_C, P_2, P_6, P_7$ and $P_8$, as illustrated in Equation 1.

$$P_C|_{new} = (P_C + P_2 + P_6 + P_7 + P_8)/5 \qquad \text{Equation 1.}$$

In the sigma filter, the degree of filtering is controlled by the sigma value. Generally, the sigma value used depends on the magnitude of the center pixel $P_C$ and increases as the value of the center pixel $P_C$ also increases. The sigma threshold function used to determine the sigma value is a characteristic of the image sensor used to create the image. By modifying the function so that the sigma value is increased, the amount of filtering in an image is also increased. However, if the sigma value is increased too much, high-contrast edges in the images will be smoothed and lost.

Additionally, in the sigma filter, the size of the window around the center pixel $P_C$ is identified as the filter kernel. Increasing the size of the filter kernel increases the number of pixel elements available for averaging. However, this also increases the number of computations required to evaluate the window. Therefore, increasing the size of the filter kernel becomes, at some point, impractical. On the other hand, reducing the size of the filter kernel also reduces the effectiveness of the sigma filter. A 5×5 pixel kernel is often used for the sigma filter.

The degree of filtering that may be used on an image depends on the image itself. A feature-rich image which includes a high level of detail that must be preserved must be carefully filtered so as to not lose any important details. On the other hand, a "flat," featureless image can be broadly filtered. A sigma filter can be used to filter both feature-rich and flat images, though it is desirable to use a broader filter to filter flat regions. Therefore, there is a need for an image filter that can filter flat regions of images more effectively than a conventional sigma filter.

DETAILED DESCRIPTION OF THE INVENTION

Figure 1A:
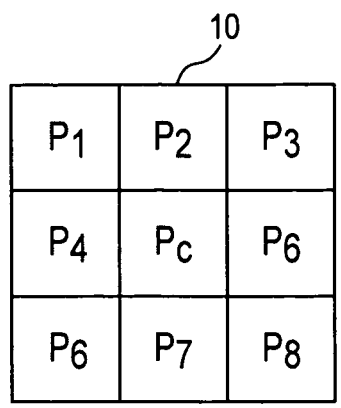
FIGS. 1A and 1B illustrate an example of a sigma filter.

One method of increasing the smoothing effectiveness of an image filter such as a sigma filter is to increase the size of the filter kernel. However, as explained above, increasing the filter kernel size results in an increase in computational complexity. Generally, for a sigma filter, the application of the filter requires approximately $n^2$ comparisons, where n is the number of pixels on one side of the filter kernel. Thus, even a small increase in the filter kernel size results in a large increase in calculations. For example, the filter kernel in FIG. 1A is a 3×3 kernel, requiring 9 comparisons. A 4×4 or a 5×5 filter kernel would require 16 or 25 comparisons, respectively.

Increased filtering of flat images or flat regions of images can instead be achieved using a flat region filter, as disclosed below. Flat region filters are not only more effective than conventional sigma filters at smoothing flat regions of images, but flat region filters are also configured to identify whether a region to be filtered is flat. In one conventional flat region filter, the average pixel values of multi-pixel blocks are stored. The standard deviation of the averages is calculated. As long as the calculated standard deviation is less than a predefined threshold, the region encompassed by the multi-pixel blocks is considered to be flat. Accordingly, the center block of the multi-pixel blocks in the flat region is filtered. Each pixel in the center block is filtered through a combination of conventional sigma filtering and a weighted average of the block average pixel values. The weighted average of the block average pixel values is the same for each pixel in the center block.

Application of a conventional sigma filter and a conventional flat region filter requires significant memory resources. Shifting a conventional sigma filter to evaluate every pixel $P_i$ in a pixel block P and in neighboring pixel blocks requires computational time and memory. A typical filter kernel for a conventional sigma filter is a 5×5 pixel kernel. Thus, for each application of a conventional sigma filter, five rows of pixel values must be read into memory. However, even larger filter kernels may also be used, thus increasing the number of pixel rows to be read into memory.

The conventional flat region filter also requires memory. Although the filter kernel for a conventional flat region filter applied to pixels $P_i$ in pixel block P is constant and unmoving (i.e., the filter kernel does not shift for each pixel $P_i$ in block P), thus reducing computational time, the overall memory requirements for a conventional flat region filter are still significant. For the 9×9 filter kernel of FIG. 2B, which includes nine pixel blocks, the evaluation of each pixel $P_i$ in pixel block P requires that the value of pixel $P_i$ and eight block average pixel values be stored in memory. This equates to one pixel row of memory storage. Additionally, because the conventional flat region filter may not be applied to pixels $P_i$ in pixel block P (because, for example, the block average pixel values may differ from the values of pixels $P_i$ by at least the sigma value), several pixel rows (e.g., five rows for a 5×5 pixel conventional sigma filter kernel) must be stored in memory to allow application of the conventional sigma filter to the pixels $P_i$ in pixel block P. Because pixel values in an imager are read out one row at a time (and not simply one 9×9 block at a time), the imager memory must store entire rows of pixel values before each necessary pixel value is available for conventional sigma or conventional flat region filtering.

Figure 2A:
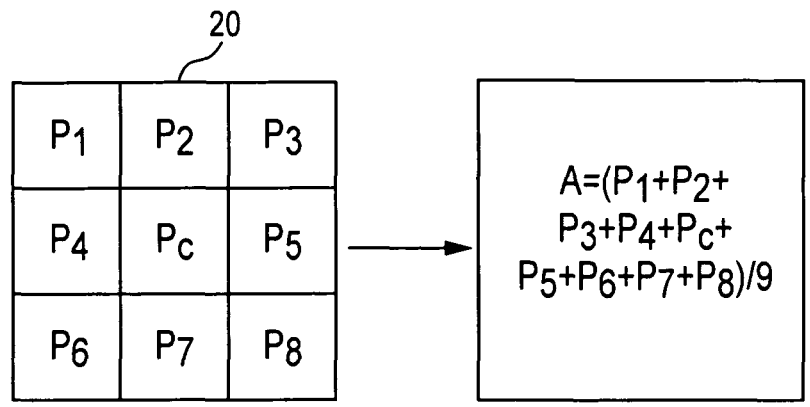
FIGS. 2A, 2B and 2C illustrate an example of a macro sigma filter, according to a disclosed embodiment.
Figure 2B:
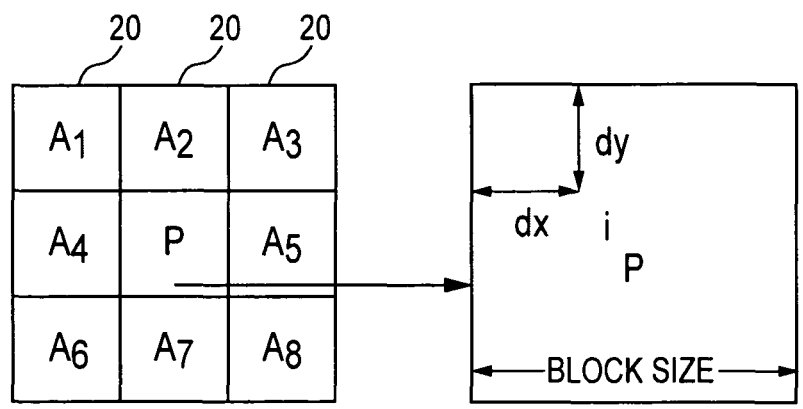

Additionally, in an image processing pipeline, pixel values are received and rendered in a serial fashion. In an image where pixels are serially received, left-to-right, top-to-bottom, the conventional flat region filter of FIG. 2B is not practical. At most, block average pixel values $A_1, A_2, A_3, A_4$ and maybe $A_5$ can be calculated and applied to pixels $P_i$ in block P. However, block average pixel values $A_6, A_7$ and $A_8$ are read out too late to apply directly to pixels $P_i$ in block P. Instead, the pixel row that includes pixel $P_i$ and all pixel rows in the filter kernel below the pixel row with pixel $P_i$ must be stored in memory so as to allow calculation of a new pixel value for pixel $P_i$.

Figure 2C:
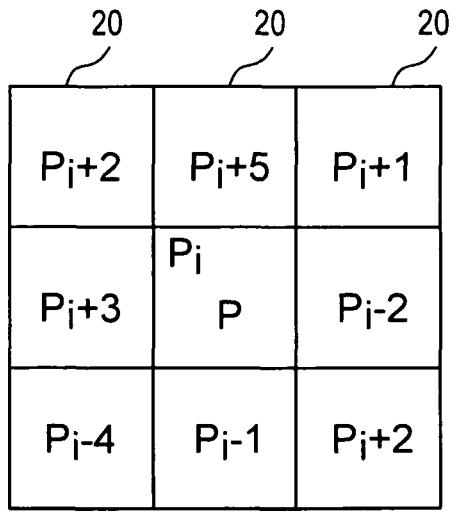
Figure 3:
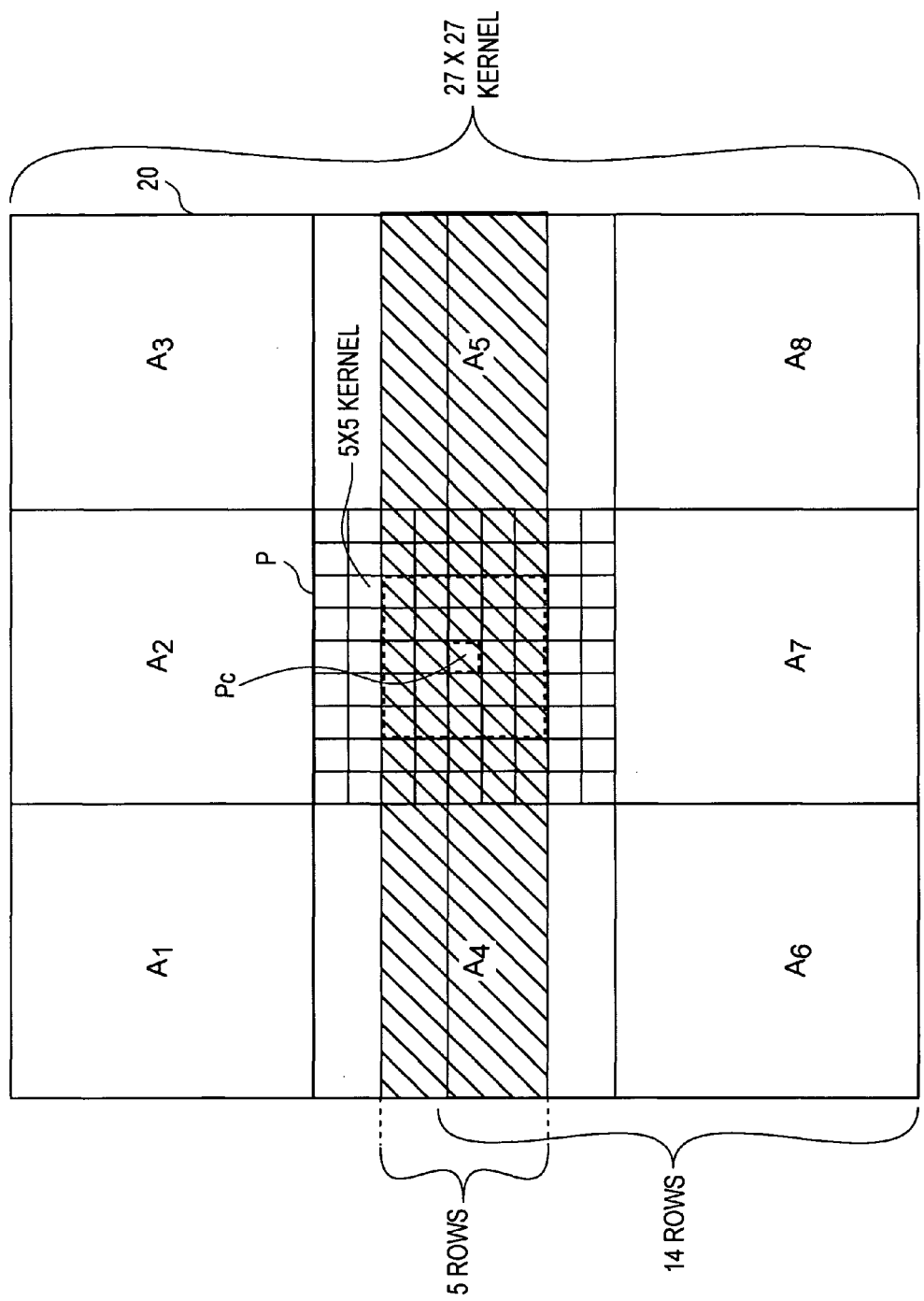
FIG. 3 illustrates the memory requirements of implementing both a sigma filter and a conventional flat region filter.

As an example, FIG. 3 illustrates the number of rows needed for storage in memory to facilitate evaluation of a center pixel $P_C$ using both a conventional sigma filter and a conventional flat region filter. Center pixel $P_C$ is located within a 9×9 pixel block P. Pixel block P is bordered by other 9×9 pixel blocks 20. Although FIGS. 2A-2C illustrate 3×3 pixel blocks for use with a conventional flat region filter, larger blocks such as 9×9 pixel blocks are more effective. In FIG. 3, a 27×27 pixel conventional flat region filter kernel is illustrated, which includes pixel block P and neighboring pixel blocks with block average pixel values $A_1, A_2, A_3, A_4, A_5, A_6, A_7$, and $A_8$. Application of a conventional flat region filter on the center pixel $P_C$ requires reading into memory the pixel row in which the center pixel $P_C$ is located and all pixel rows in the kernel that are below the center pixel $P_C$. One row of block average pixel values is stored. Additionally, in the event that the conventional flat region filter cannot be applied to the center pixel $P_C$ (due to non-flatness of the region), five pixel rows centered at the center pixel $P_C$ are stored for application of the conventional sigma filter. Thus, a total of 16 rows of pixel values are stored and 1 row of block average pixel values are stored in order to facilitate the calculation of a new value for the center pixel $P_C$. It is desirable to reduce these memory requirements.

In order to improve upon the memory requirements of the conventional flat region filter and increase its practicality for use in an image processing pipeline, an improved flat region filter is disclosed according to an embodiment of the invention. The improved flat region filter is a macro sigma filter. In the macro sigma filter, the average pixel values of multi-pixel blocks are stored and used as pixel elements of a sigma filter application on another pixel. The macro sigma filter is only applied when the difference between the pixel value being filtered and all of the block average pixel values is less than a sigma value. This is different from the conventional sigma filter, which compares pixel values to pixel values. The macro sigma filter compares a pixel value to several block average pixel values, and the macro sigma filter is only used if every comparison or difference in values is less than a sigma value. This ensures that the macro sigma filter is only applied within a flat region of an image, wherein the degree of "flatness" is defined by the sigma value. When the sigma value is very small, the macro sigma filter is only applied to regions whose pixel values differ by a very small amount (i.e., an amount that is smaller than the already very small sigma value). On the other hand, when the pixel to be filtered varies from the block average pixel values by at least the sigma value, then the region is not considered to be flat, and a conventional sigma filter is used.

Figure 1B:
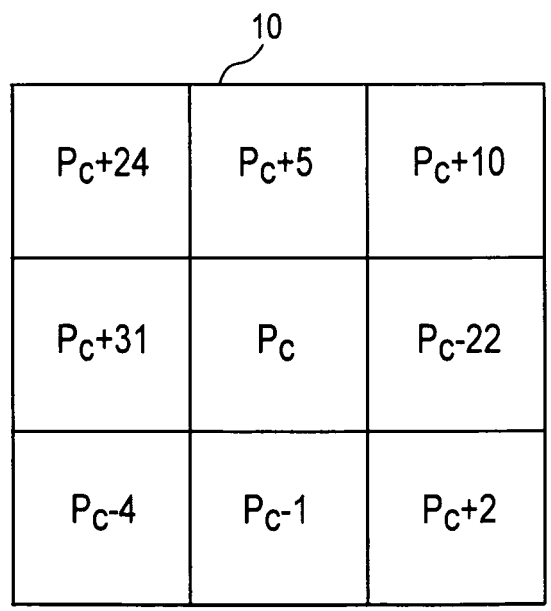

FIGS. 2A, 2B and 2C illustrate the basic concept of the macro sigma filter as described above. In FIG. 2A, a 3×3 block 20 of pixels is illustrated. The block 20 could also be a different size, for example, 5×5 or 9×9 pixels. The 3×3 block 20 includes pixels $P_1, P_2, P_3, P_4, P_5, P_6, P_7, P_8$ and center pixel $P_C$. As with the conventional sigma filter of FIGS. 1A and 1B, the pixels represented in block 20 are each like-colored pixels. Other pixels of different color are interspersed between the represented pixels, but because comparisons are only made with like-colored pixels, only like-colored pixels are illustrated. For FIG. 2A, an average value A for the block 20 is calculated, as illustrated in Equation 2.

$$A=(P_1+P_2+P_3+P_4+P_C+P_5+P_6+P_7+P_8)/9 \qquad \text{Equation 2.}$$

In FIG. 2B, a macro sigma filter is applied to pixel block P. Pixel block P is also a 3×3 block of pixels. Pixel block P is bounded by other 3×3 pixel blocks 20. Each neighboring pixel block 20 is represented by an average pixel value $A_1, A_2, A_3, A_4, A_5, A_6, A_7$ and $A_8$ calculated according to Equation 2. Pixel block P includes pixels $P_i$, where i ranges from 1-9 (in the case of a 3×3 pixel block).

In FIG. 2C, each pixel $P_i$ of pixel block P is individually evaluated and filtered using a macro sigma filter. The average pixel values for neighboring blocks are used to determine a new value for pixel $P_i$. If all of the neighboring block average pixel values differ from the value of pixel $P_i$ by less than a sigma value, then pixel $P_i$ is filtered by all of the block average pixel values. As an example, for a given pixel $P_i$ in block P, average value $A_1$ is equal to pixel value $P_i$ plus two. As part of the same example, $A_2=P_i+5$, $A_3=P_i+1$, $A_4=P_i+3$, $A_5=P_i-2$, $A_6=P_i-4$, $A_7=P_i-1$, and $A_8=P_i+2$. If the sigma value is equal to seven example), then all of the average block values $A_1$-$A_8$ differ from the value of pixel $P_i$ by less than the sigma value. Thus, the macro sigma filter may be used, and the filtered value of pixel $P_i$ is governed by Equation 3.

$$P_i|_{new}=(P_i+A_1+A_2+A_3+A_4+A_5+A_6+A_7+A_8)/9 \qquad \text{Equation 3.}$$

In practice, when filtering pixel values, either a conventional sigma filter is used or the macro sigma filter is used. The macro sigma filter is used for flat regions of the image. Flat regions are identified by a finding of all block average pixel values in a filter kernel differing from the value of the pixel to be filtered by less than a sigma value. This indicates that the pixel values in the kernel are generally all very similar, and that the image in the kernel is generally flat. However, if even a single block average pixel value differs from the pixel $P_i$ by at least the sigma value, then the macro sigma filter is not applied to the pixel $P_i$. Instead, the conventional sigma filter is applied.

Figure 4:
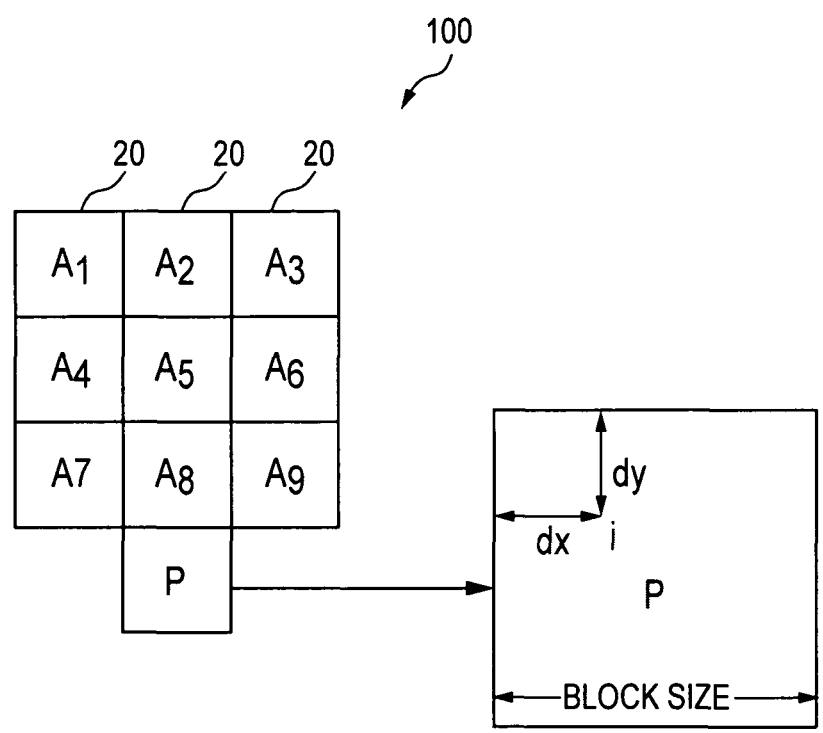
FIG. 4 illustrates a macro sigma filter, according to disclosed embodiments.

An additional improvement upon the memory requirements of the conventional flat region filter is disclosed as an improved macro sigma filter. The improved macro sigma filter is a variation of the macro sigma filter as described above. The improved macro sigma filter utilizes block average pixel values to filter the value of a pixel in a pixel block P, just as in the macro sigma filter. However, in the improved macro sigma filter, the pixel block P which includes the pixel to be filtered is not located in the center of neighboring pixel blocks with corresponding block average pixel values. Instead, the pixel block P is located below the pixel blocks whose block average pixel values are used to filter the value of a pixel in pixel block P. By having the pixel block P be downstream of the pixel blocks to be used for filtering, pixel values in the utilized pixel blocks are read out fully before pixel block P is read out. FIG. 4 illustrates the layout of pixel blocks utilized by the improved macro sigma filter 100. In FIG. 4, pixel block P, which is a 5×5 block of pixels $P_i$, is modified by the block average pixel values $A_1$-$A_9$. Pixel block P is located below the modifying pixel blocks 20. In this way, values for pixel blocks 20 are read out and block average pixel values calculated prior to the read out of pixel block P.

Modification or smoothing of pixels $P_i$ in block P by block average pixel values $A_1$-$A_9$ only happens if each of the block average pixel values $A_1$-$A_9$ differs in value by less than a sigma value from the value of the pixel $P_i$ to be modified. If even one of the block average pixel values $A_1$-$A_9$ has a value that differs from the value of pixel $P_i$ by at least the sigma value, then pixel $P_i$ is not modified using the improved macro sigma filter 100. The conventional sigma filter is instead used.

Figure 5:
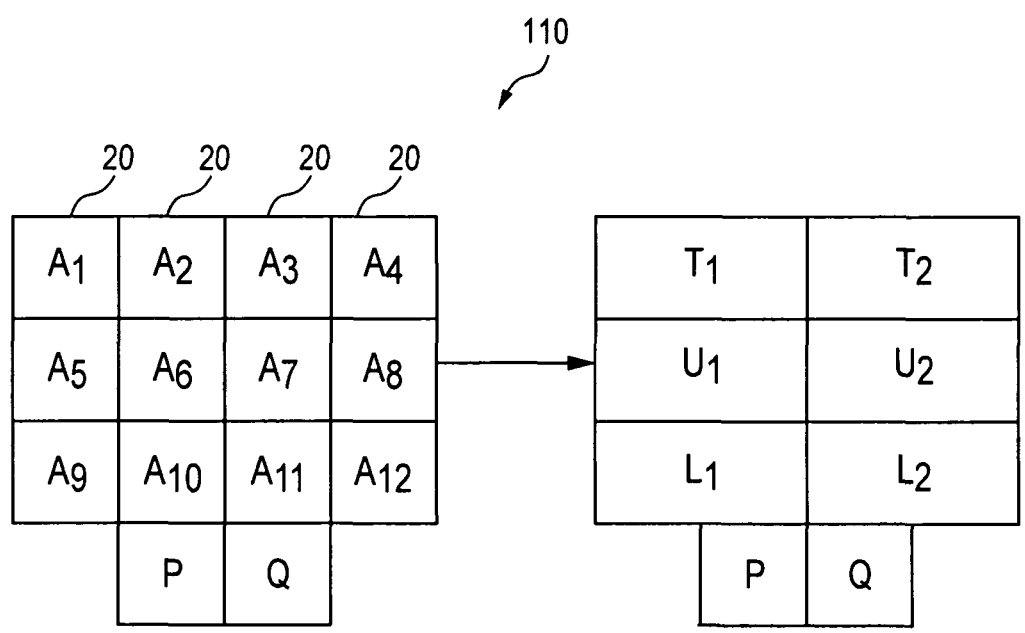
FIG. 5 illustrates a bilateral macro sigma filter, according to disclosed embodiments.

To benefit from an even larger filter kernel, additional pixel blocks may be used with corresponding block average pixel values. In a bilateral macro sigma filter 110 of FIG. 5, block average pixel values $A_1$-$A_{12}$ are calculated and applied towards pixel blocks P and Q. In order to simplify computations, larger blocks (e.g., blocks with more pixels) may be used to obtain block average pixel values. In FIG. 5, instead of using 5×5 pixel blocks, 5×10 pixel blocks are used. The 5×10 pixel blocks have block average pixel values $T_1$, $T_2$, $U_1$, $U_2$, $L_1$ and $L_2$ (for the two top pixel blocks, the two upper pixel blocks, and the two lower pixel blocks, respectively). The filtered pixel block is divided into smaller (e.g., 5×5 pixels) pixel blocks P and Q in order to capture gradual variations across the flat region and render the resulting filtered image less "blocky." Additionally, in order to further compensate for any gradual variation across the flat region, weights are applied to the values of $T_1$, $T_2$, $U_1$, $U_2$, $L_1$ and $L_2$ upon implementation of the bilateral macro sigma filter 110. Thus, the pixels near the left side of block P are more strongly modified by the block average values $T_1$, $U_1$, and $L_1$, while pixels near the right side of block P are more strongly modified by the block average values $T_2$, $U_2$ and $L_2$.

Figure 6A:
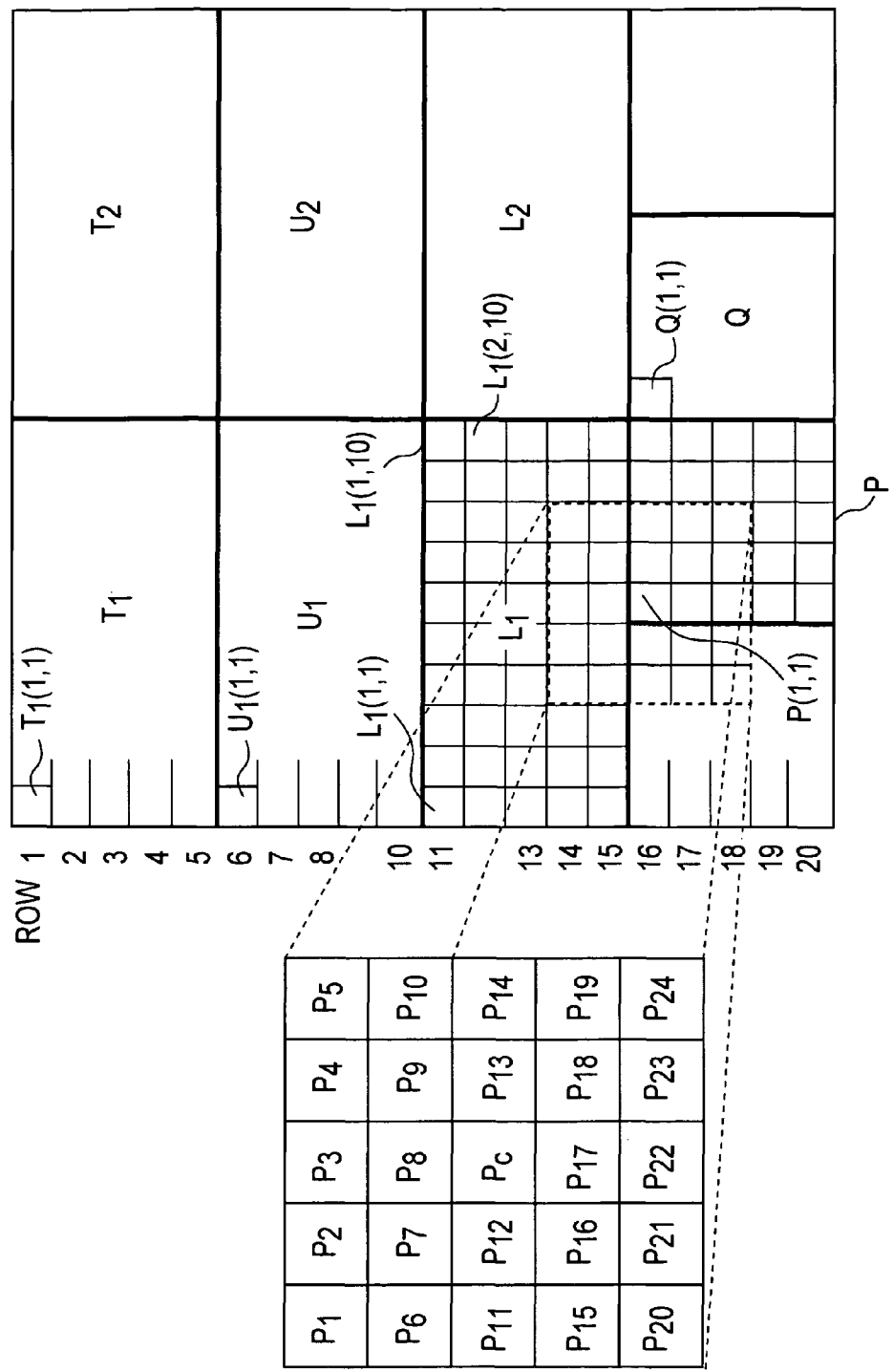
FIGS. 6A and 6B illustrate a portion of a pixel array and a method of implementing a bilateral macro sigma filter, according to disclosed embodiments.
Figure 6B:
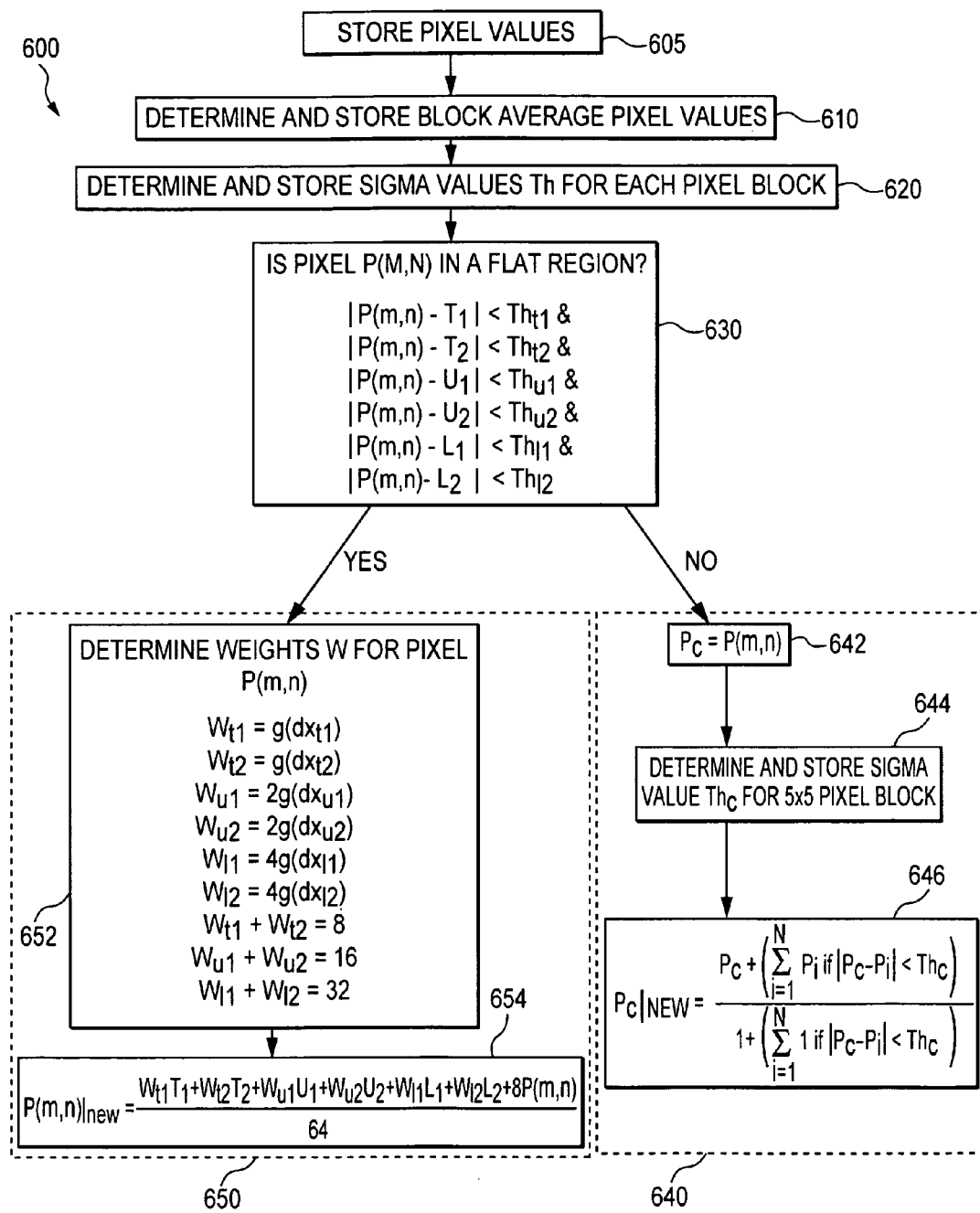

A pixel filtering process 600 in accordance with an embodiment of the invention is illustrated in FIG. 6B. The procedure 600 utilizes both the bilateral macro sigma filter 110 and the conventional sigma filter. Application of the bilateral macro sigma filter 110 and the conventional sigma filter is also illustrated on the pixel array of FIG. 6A. FIG. 6A illustrates a 20×20 pixel region from a pixel array. The 20×20 pixel region includes a 5×5 pixel block P and a 5×5 pixel block Q. Pixel block P includes pixels P(m,n), where m is the row number of pixel block P and n is the column number of pixel block P. Thus, the pixel in the top, left corner of pixel block P is pixel P(1,1).

In the example illustrated in FIG. 6A, pixel P(1,1) is the pixel to be filtered. This assumes, then, that pixel values for at least rows 1-15 have already been read out (block 605 of FIG. 6B). For reasons that will become apparent and explained below, it is preferable that pixel rows 1-15 be read out before pixel P(1,1) is filtered. This allows for the calculation of block pixel averages before application to pixel P(1,1). Additionally, pixel values from rows 14-18 are read into memory before pixel P(1,1) is filtered. Pixels from these rows are used for micro sigma filtering, if necessary. In filtering pixel P(1,1), a decision must be made regarding whether to use the bilateral macro sigma filter 110 or the conventional sigma filter. In the process 600 of FIG. 6B, the possibility of using the bilateral macro sigma filter 110 is first explored. Using the pixel values from rows 1-15, block average pixel values are calculated and stored (block 610). Thus, for pixels $T_1$(m,n), the block average pixel value $T_1$ is calculated. Similarly, block average pixel values $T_2$, $U_1$, $U_2$, $L_1$ and $L_2$ are also calculated from the pixels in their respective blocks. For each block of pixels for which a block average pixel value is calculated, a sigma threshold value Th is calculated (block 620). Many different methods may be used to determine the sigma threshold value Th. For example, the sigma threshold value could simply be a predetermined constant. Alternatively, the sigma threshold value could be the result of a linear function of the pixel values within the blocks (such as an averaging function, for example). The sigma threshold value could also be the result of a more complex, non-linear function. The Equation 4 demonstrates the calculation of sigma threshold values Th for each block, with the function f representing the method used to determine the sigma threshold value Th.

$$Th_{t1} = f(T_1)$$

$$Th_{t2} = f(T_2)$$

$$Th_{u1} = f(U_1)$$

$$Th_{u2} = f(U_2)$$

$$Th_{l1} = f(L_1)$$

$$Th_{l2} = f(L_2) \quad \text{Equation 4.}$$

After the block average pixel values have been stored ($T_1$, $T_2$, $U_1$, $U_2$, $L_1$ and $L_2$ in FIG. 6A), the value of pixel P(1,1) is compared with each of the block average pixel values $T_1$, $T_2$, $U_1$, $U_2$, $L_1$ and $L_2$ (block 630). If the pixel value P(1,1) differs from the values of all of the block average pixel values $T_1$, $T_2$, $U_1$, $U_2$, $L_1$ and $L_2$ within the filter kernel by less than the calculated sigma values $Th_{t1}$, $Th_{t2}$, $Th_{u1}$, $Th_{u2}$, $Th_{l1}$, and $Th_{l2}$ for each block, then the flat region filter is applied to the pixel P(1,1). Equation 5 demonstrates the comparison necessary to determine if the flat region filter is to be used.

$$|P(m,n) - T_1| < Th_{t1} \ \&$$

$$|P(m,n) - T_2| < Th_{t2} \ \&$$

$$|P(m,n) - U_1| < Th_{u1} \ \&$$

$|P(m,n)-U_2|<Th_{u2}$ &

$|P(m,n)-L_1|<Th_{l1}$ &

$|P(m,n)-L_2|<Th_{l2}$   Equation 5.

If the conditions of Equation 5 are met, then the flat region filter is used to filter the value of pixel P(1,1) (block 650). This means that the value of pixel P(1,1) is modified as an average value of the pixel P(1,1) and the block average pixel values $T_1, T_2, U_1, U_2, L_1$ and $L_2$. As stated before, however, in order to account for gradual fluctuations within the flat region, a weighted average may be used. For each block average pixel value, a weight W is calculated from a weighting function g (block 652). The weighting function g is inversely proportional to the pixel's P(1,1) horizontal distance dx from the pixel block to which the weighting function is applied. Horizontal distances dx may be measured from the pixel P(1,1) to an edge of the pixel block to which the weighting function is applied, or the distances dx may be measured from the pixel P(1,1) to the center of the pixel block to which the weighting function is applied. In either case, the weighting function g is linear. In this way, the weighting function g accounts for gradual pixel value changes in the horizontal direction of the flat region. Gradual pixel value changes in the vertical direction may also be accounted for using, for example, the equation set demonstrated in Equation 6. Equation 6 demonstrates how block average pixel values for blocks that are geometrically closer to the pixel P(1,1) are accorded more weight than block average pixel values for blocks that are geometrically further away from the pixel P(1,1).

$W_{t1}=g(dx_{t1})$ $W_{t2}=g(dx_{t2})$ $W_{u1}=2g(dx_{u1})$ $W_{u2}=2g(dx_{u2})$ $W_{l1}=4g(dx_{l1})$ $W_{l2}=4g(dx_{l2})$ $W_{t1}+W_{t2}=8$ $W_{u1}+W_{u2}=16$ $W_{l1}+W_{l2}=32$   Equation 6.

The weighted average and the flat region filter result is shown in Equation 7 (block 654).

$$P(m,n)|_{new} = \frac{W_{t1}T_1 + W_{t2}T_2 + W_{u1}U_1 + W_{u2}U_2 + W_{l1}L_1 + W_{l2}L_2 + 8P(m,n)}{64}.$$ Equation 7

If the condition of Equation 5 is not met with regards to pixel P(1,1), then the conventional sigma filter is applied to pixel P(1,1), as illustrated in FIG. 6A and at block 640 of FIG. 6B. In this case, pixel P(1,1) becomes the center pixel $P_C$ of a 5×5 pixel block comprised of pixels $P_i$ (block 642). A sigma value Thc for the 5×5 block is calculated, as demonstrated in Equation 8 (block 644). For example, the sigma value $Th_C$ could be a standard deviation of the pixels $P_i$ in the 5×5 block.

$Th_C=f(P_C)$   Equation 8.

A comparison is made between the center pixel $P_C$ and each of the pixels $P_i$. Those pixels $P_i$ that differ in value from the value of the center pixel $P_C$ by less than the sigma value $Th_C$ are used to filter pixel $P_C$ according to the sigma filter and Equation 9 (block 646). In Equation 9 and for the example of FIG. 6B, N equals 24, meaning that the center pixel $P_C$ is compared with 24 other pixels $P_i$ in the 5×5 pixel block.

$$P_C|_{new} = \frac{P_C + \left(\sum_{i=1}^{N} P_i \text{ if } |P_C - P_i| < Th_C\right)}{1 + \left(\sum_{i=1}^{N} 1 \text{ if } |P_C - P_i| < Th_C\right)}.$$ Equation 9

Once pixel P(1,1) is filtered using either the bilateral macro sigma filter 110 or the conventional sigma filter, filter application may be shifted to pixel P(1,2). For any pixel P(m,n) in pixel block P, or for any pixel Q(m,n) in pixel block Q, Equations 6 and 7 are applied if the conditions of Equation 5 are met. In other words, the block average pixel values $T_1, T_2, U_1, U_2, L_1$ and $L_2$ need not be recalculated. Only the weights W and the new filtered pixel value need be determined. If, for pixel P(1,2) or any other pixel $P_i$ or $Q_i$ in pixel blocks P or Q, respectively, does not meet the conditions of Equation 5, then the conventional sigma filter is applied to the pixel $P_i$ or $Q_i$, using the shifting 5×5 pixel kernel.

It should be understood that using a 5×5 pixel kernel for the conventional sigma filter or 5×10 pixel blocks for the bilateral macro sigma filter are exemplary kernel and block dimensions only. Other dimensions may be used, if desired.

The macro sigma filters described herein improve upon the conventional flat region filter described above without incurring significant memory costs. The macro sigma filter, the improved macro sigma filter and the bilateral macro sigma filter result in smoother flat region images while maintaining edges and other fine details. Because the macro sigma filters are only used for flat regions, other filters such as the conventional sigma filter may be used where more detail exists. Additionally, the use of weighting functions in the bilateral macro sigma filter helps to remove any "blockiness" in the processed image.

As can be appreciated, the macro sigma filter, improved macro sigma filter and the bilateral macro sigma filter are not able to be applied to the first few analyzed pixel rows of an image. In the examples described above utilizing 5×10 blocks and at least three rows of block average pixel values, the bilateral macro sigma filter is not able to be applied to pixels within the first 13 rows of the image, nor to pixels within the first and last 5 columns of the image. These pixels are filtered using either a modified macro sigma filter or bilateral macro sigma filter or a different filter such as e.g., the conventional sigma filter. The modified macro sigma filter or bilateral macro sigma filter is modified by shifting the P and Q pixel blocks upwards so that fewer pixel rows must be read out and evaluated prior to any filtering of pixels in the P and Q pixel blocks. If desired, the pixel blocks P and Q could be shifted upwards so that only the top three rows of an image are not able to be filtered using either the macro sigma filter or the bilateral macro sigma filter.

The flat region filters, as described above, may be implemented using either hardware or software or via a combination of hardware and software. For example, in a semiconductor CMOS imager 900, as illustrated in FIG. 7, the macro sigma filter 100 and the bilateral macro sigma filter 110 may be implemented within an image processor 980 pipeline using hardware circuits.

Figure 7:
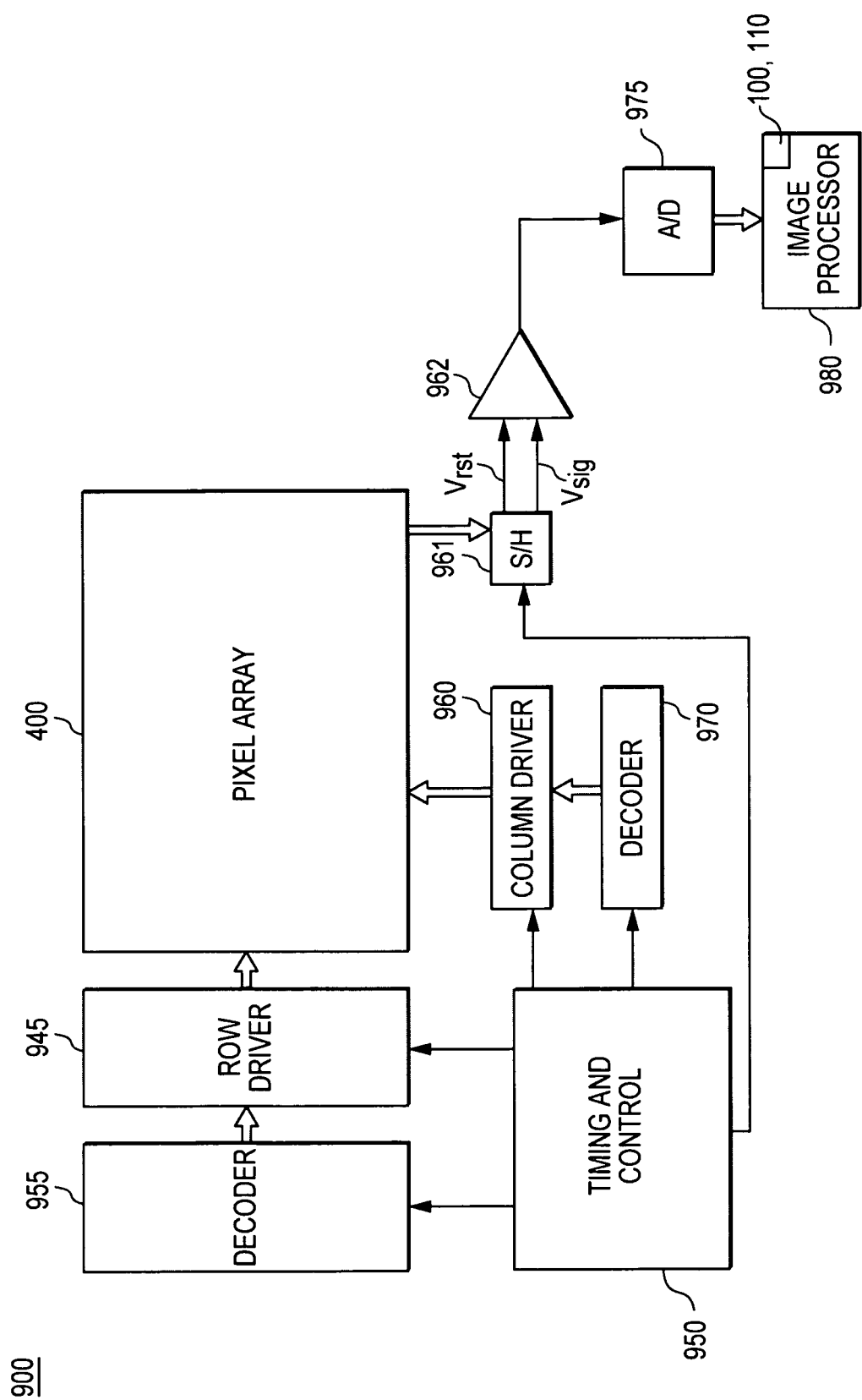
FIG. 7 is a block diagram of an imager, according to disclosed embodiments.

FIG. 7 illustrates a simplified block diagram of a semiconductor CMOS imager 900 having a pixel array 400 including a plurality of pixel cells arranged in a predetermined number of columns and rows. Each pixel cell is configured to receive incident photons and to convert the incident photons into electrical signals. Pixel cells of pixel array 400 are output row-by-row as activated by a row driver 945 in response to a row address decoder 955. Column driver 960 and column address decoder 970 are also used to selectively activate individual pixel columns. A timing and control circuit 950 controls address decoders 955, 970 for selecting the appropriate row and column lines for pixel readout. The control circuit 950 also controls the row and column driver circuitry 945, 960 such that driving voltages may be applied. Each pixel cell generally outputs both a pixel reset signal $v_{rst}$ and a pixel image signal $v_{sig}$, which are read by a sample and hold circuit 961 according to a correlated double sampling ("CDS") scheme. The pixel reset signal $v_{rst}$ represents a reset state of a pixel cell. The pixel image signal $v_{sig}$ represents the amount of charge generated by the photosensor in the pixel cell in response to applied light during an integration period. The pixel reset and image signals $v_{rst}$, $v_{sig}$ are sampled, held and amplified by the sample and hold circuit 961. The sample and hold circuit 961 outputs amplified pixel reset and image signals $V_{rst}$, $V_{sig}$. The difference between $V_{sig}$ and $V_{rst}$ represents the actual pixel cell output with common-mode noise eliminated. The differential signal (e.g., $V_{rst}-V_{sig}$) is produced by differential amplifier 962 for each readout pixel cell. The differential signals are digitized by an analog-to-digital converter 975. The analog-to-digital converter 975 supplies the digitized pixel signals to an image processor 980, which forms and outputs a digital image from the pixel values. The output digital image is the filtered image resulting, in part, from the macro sigma filters 100, 110 of the image processor 980. Of course, the macro sigma filters 100, 110 may also be separate from the image processor 980. The pixel values input to the macro sigma filters 100, 110 are the differential signal $V_{rst}-V_{sig}$.

The macro sigma filters 100, 110 may be used with any type of image sensor providing color pixel signals and is not limited to use in a CMOS imager. For example, the macro sigma filters 100, 110 may be used with pixel signals obtained from a CCD or other type of image sensor. In addition, the macro sigma filters 100, 110 may be used in any imaging system which employs an imager device, including, but not limited to a computer system, camera system, scanner, machine vision, vehicle navigation, video telephone, surveillance system, automatic focus system, star tracker system, motion detection system, image stabilization system, and other imaging systems. Example digital camera systems in which the embodiments may be used include video digital cameras, still cameras with video options, cellular telephone cameras, handheld personal digital assistant (PDA) cameras, and other types of cameras. The invention may also be used in a stand-alone image processor, such as a personal computer programmed to implement the described macro sigma filter 100, 110 process.

Figure 8:
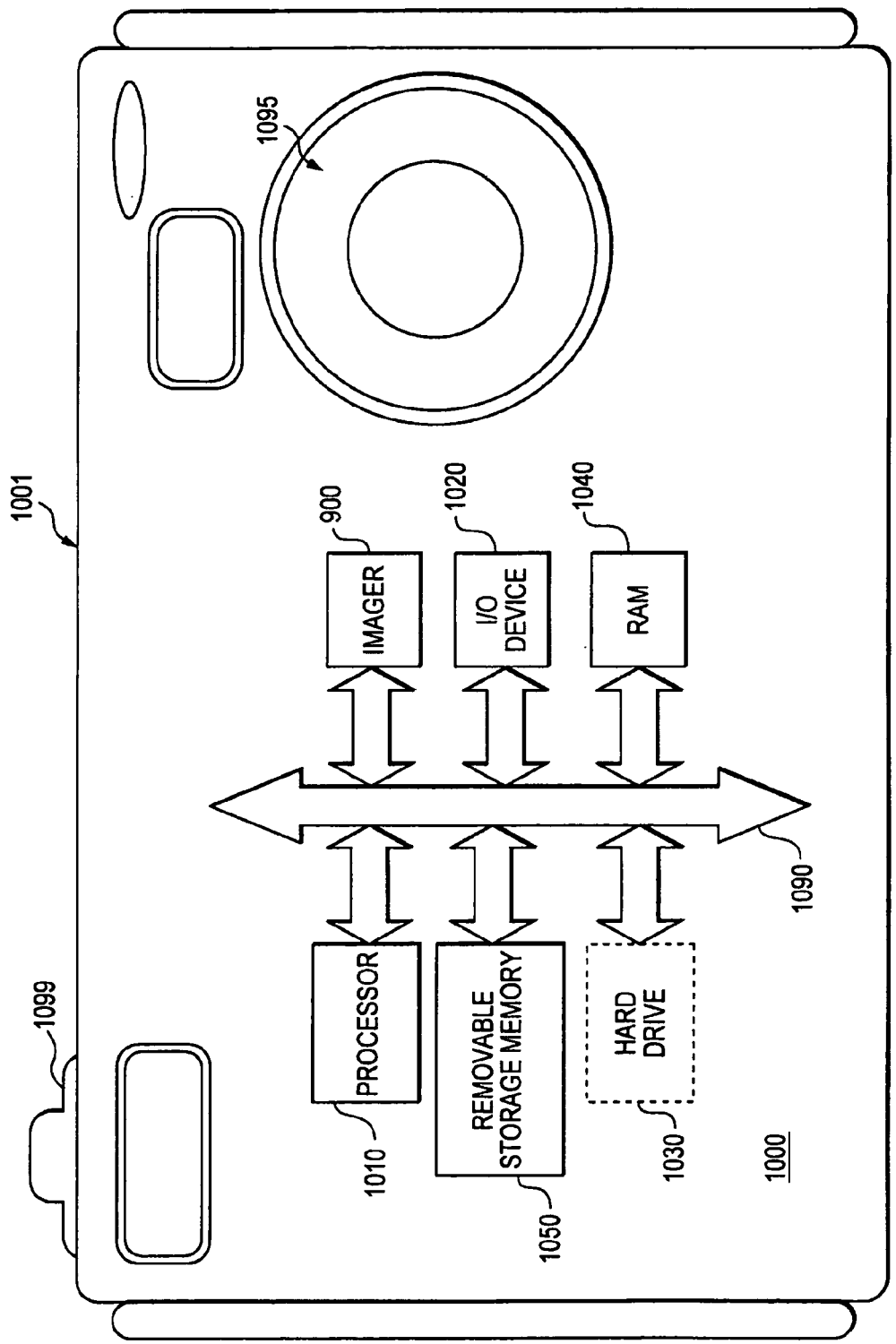
FIG. 8 is a block diagram of an imaging system, according to disclosed embodiments.

FIG. 8 shows a typical system 1000 which is part of a digital camera 1001. The system 1000 includes an imaging device 900, which includes either software or hardware to implement the macro sigma filters 100, 110 in accordance with the embodiments described above. System 1000 generally comprises a processing unit 1010, such as a microprocessor, that controls system functions and which communicates with an input/output (I/O) device 1020 over a bus 1090. Imaging device 900 also communicates with the processing unit 1010 over the bus 1090. The system 1000 also includes random access memory (RAM) 1040, and can include removable storage memory 1050, such as flash memory, which also communicates with the processing unit 1010 over the bus 1090. Lens 1095 focuses an image on a pixel array of the imaging device 900 when shutter release button 1099 is pressed.

The system 1000 could alternatively be part of a larger processing system, such as a computer. Through the bus 1090, the system 1000 illustratively communicates with other computer components, including but not limited to, a hard drive 1030 and one or more removable storage memory 1050. The imaging device 900 may be combined with a processor, such as a central processing unit, digital signal processor, or microprocessor, with or without memory storage on a single integrated circuit or on a different chip than the processor.

What is claimed as new and desired to be protected by Letters Patent of the United States is:

1. A method of applying a flat region filter to pixels in an image, comprising:
   dividing a region of the image into pixel blocks;
   determining block average pixel values for each of the pixel blocks; and
   using the determined block average pixel values to smooth a value of a first pixel located outside of the region and downstream of the pixel blocks, wherein the block average pixel values are used to smooth the value of the first pixel only if the first pixel differs in value with each of the block average pixel values by less than a threshold value.

2. The method of claim 1, wherein each of the pixel blocks has a corresponding threshold value.

3. The method of claim 2, wherein the threshold values represent the standard deviation of pixel values for each pixel block.

4. The method of claim 1, wherein the block average pixel values are weighted.

5. The method of claim 4, wherein the weighting of the block average pixel values is based on a distance between the first pixel and the respective pixel blocks.

6. A method of processing an image, comprising:
   receiving pixel values corresponding to a captured image;
   processing the received pixel values by:
     determining block average pixel values for first blocks of the received pixel values;
     determining a threshold value for each first block;
     finding a first pixel value that is not included in the first blocks and that differs in value with each of the block average pixel values by less than the corresponding block threshold values; and
     replacing the first pixel value with an average of the first pixel value and the block average pixel values.

7. The method of claim 6, wherein the step of replacing the first pixel value comprises using a weighted average, the weights applied to each block average pixel value being based on a distance between the first pixel and the respective first blocks.

8. The method of claim 6, wherein the threshold values represent the standard deviation of pixel values for each first block.

9. The method of claim 6, further comprising:
   finding a second pixel value that is not included in the first blocks of received pixel values and that differs in value with any of the block average pixel values by at least the corresponding block threshold value;
   determining a threshold value for a second block of pixels wherein the second pixel is a center pixel; and replacing the second pixel value with an average of the second pixel value and pixels within the second block that differ from the second pixel value by less than the threshold value for the second block.

10. The method of claim 9, wherein the threshold value for the second block represents the standard deviation of pixel values in the second block.

11. An apparatus implementing an image filter, the filter comprising:
a first filter that utilizes pixel values to smooth pixels that differ in value with block average pixel values of pixel blocks by at least a threshold value; and
a second filter that utilizes the block average pixel values of pixel blocks to smooth pixels that differ in value by less than the threshold value and that are downstream of the pixel blocks used by the first filter.

12. The apparatus of claim 11, wherein the second filter includes a threshold function for determining the threshold value for each pixel block.

13. The apparatus of claim 12, wherein the threshold values are a standard deviation for pixel values within each pixel block.

14. The apparatus of claim 11, wherein the second filter includes a weighting function for applying weights to the block average pixel values, the weighting function being based on a distance between the pixel being filtered and the respective pixel blocks.

15. An imager, comprising:
a pixel array that generates pixel values representing an image; and
a processor implementing an image filter, the image filter including a first sigma filter that utilizes block average pixel values of blocks of pixels of the pixel array to smooth pixels that are downstream of the pixel blocks used by the first sigma filter, wherein the image filter includes a second sigma filter, different from the first sigma filter, to smooth pixels that differ in value from the block average pixel values by at least a threshold value.

16. The imager of claim 15, wherein the second sigma filter includes a threshold function for determining a threshold value for a pixel to be filtered.

17. The imager of claim 16, wherein the threshold value is a standard deviation for pixels in a window of pixels wherein the pixel to be filtered is a center pixel.

18. The imager of claim 17, wherein the second sigma filter smoothes the pixel to be filtered by replacing the value of the pixel to be filtered by an average value of the center pixel and other pixels within the window of pixels that differ from the center pixel by less than the threshold value.

19. The imager of claim 15, wherein the first sigma filter includes a weighting function for applying weights to the block average pixel values based on a distance between the pixel being filtered and the respective pixel blocks.

20. An imager, comprising:
a pixel array that generates pixel values representing an image; and
a processor implementing an image filter, the image filter including a first sigma filter that utilizes block average pixel values of blocks of pixels of the pixel array to smooth pixels that are downstream of the pixel blocks used by the first sigma filter, wherein the first sigma filter includes a threshold function for determining a threshold value for each pixel block, wherein the first sigma filter smoothes pixels that differ in value from each of the block average pixel values by less than the corresponding threshold values.

21. The imager of claim 20, wherein the first sigma filter smoothes a pixel to be filtered by replacing the value of the pixel to be filtered by an average value of the pixel to be filtered and the block average pixel values.

* * * * *